Nov. 1, 1966  F. E. COMPTON  3,281,898
PRESET NOZZLE RETAINER FOR AN INJECTION MOLDING MACHINE
Filed Oct. 28, 1963  2 Sheets-Sheet 1

INVENTOR.
FRANCIS E. COMPTON
BY
Kenyon & Kenyon
ATTORNEYS

United States Patent Office 3,281,898
Patented Nov. 1, 1966

3,281,898
PRESET NOZZLE RETAINER FOR AN INJECTION MOLDING MACHINE
Francis E. Compton, Rochester, N.Y., assignor to Farrel Corporation, Rochester, N.Y., a corporation of Connecticut
Filed Oct. 28, 1963, Ser. No. 319,101
9 Claims. (Cl. 18—30)

This invention relates to holding injection molding machine nozzles in place and, more particularly, to a nozzle retainer assembly which may be quickly preset in position snug against a shoulder on the nozzle and by means of which the nozzle may be easily subjected to high preload.

During the operation of injection molding machines, and particularly rubber injection molding machines, it is frequently necessary to remove the torpedo from the heating chamber, e.g., for cleaning. This is conveniently done by providing a nozzle that can itself be removed to provide access to the torpedo.

At the same time, the nozzle must withstand the extreme injection pressures and the stresses these pressures create against the nozzle area that closes the injection heating chamber, except for the small opening through which the rubber or other plastic material is injected. Moreover, the nozzle must be precompressed against its seat so that the normal stretch of the steel material holding it in place will not result in leakage between the seat and nozzle under working conditions.

Various means have been tried in the past to conveniently provide the pressures needed to preload the nozzle. In practice, many machines have been supplied with a large annular nut that is threaded into the end of the injection cylinder so as to bear against the nozzle. But threading the nut in and out for each removal operation is a time consuming operation. Moreover, high frictional drag must be overcome to turn such a nut under the loads that are needed. Even with large spanner wrenches and bars, it is almost impossible to achieve the required torques by manual means.

It is an object of the present invention to provide means for quickly preloading a nozzle in position on its seat at the head of an injection molding machine, and for quickly removing it as required.

It is a further object of the invention to provide preloading means which can be easily and manually operated.

It is a further object of the invention to provide preloading means which break loose relatively easily when the nozzle must be dismantled as for the removal of the torpedo.

The invention is adapted for use in otherwise well known injection molding machines. Briefly, and according to the illustrated embodiment of the invention, a nozzle retainer assembly is provided with quick locking means, for example, breech lock threads, that make it possible for the assembly to be preset in position in the front of an injection cylinder counterbore against a shoulder on the nozzle. A partial turn, under little load, locks it snugly in place. This retainer assembly is also provided with high pressure assembly or means, for example, a series of jack screws. These screws may be individually and alternately tightened at reasonable torque to provide, between them, the required compression.

The invention may be best understood by reference to the following drawings in which.

Figure 1:
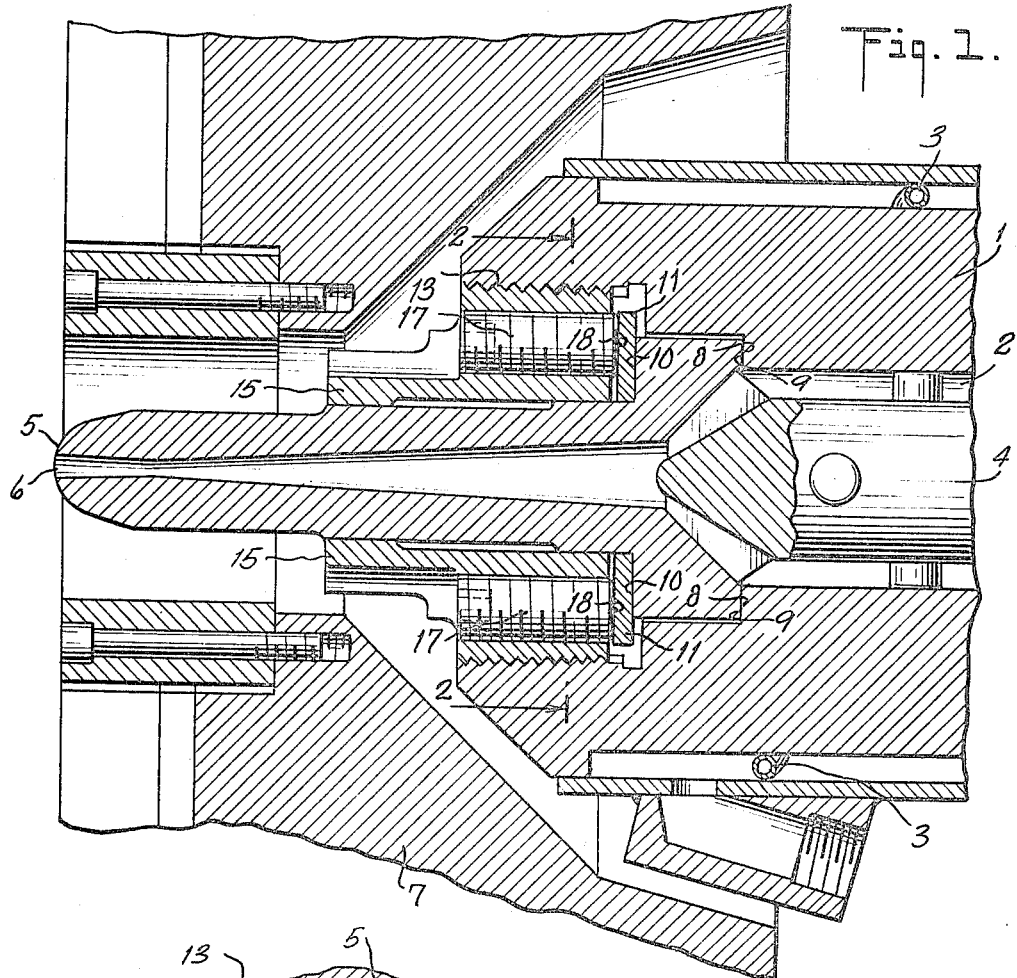
FIG. 1 is a side sectional elevation of the nozzle assembly for an injection molding machine.
Figure 2:
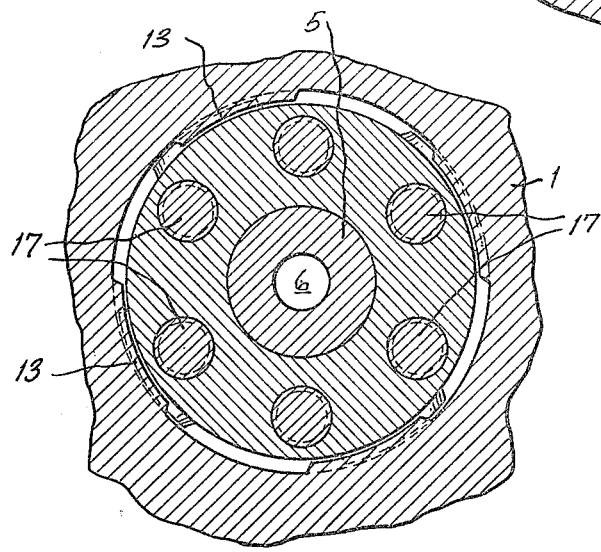
FIG. 2 is a left side sectional elevation taken generally along the line 2—2 in FIG. 1.
Figure 3:
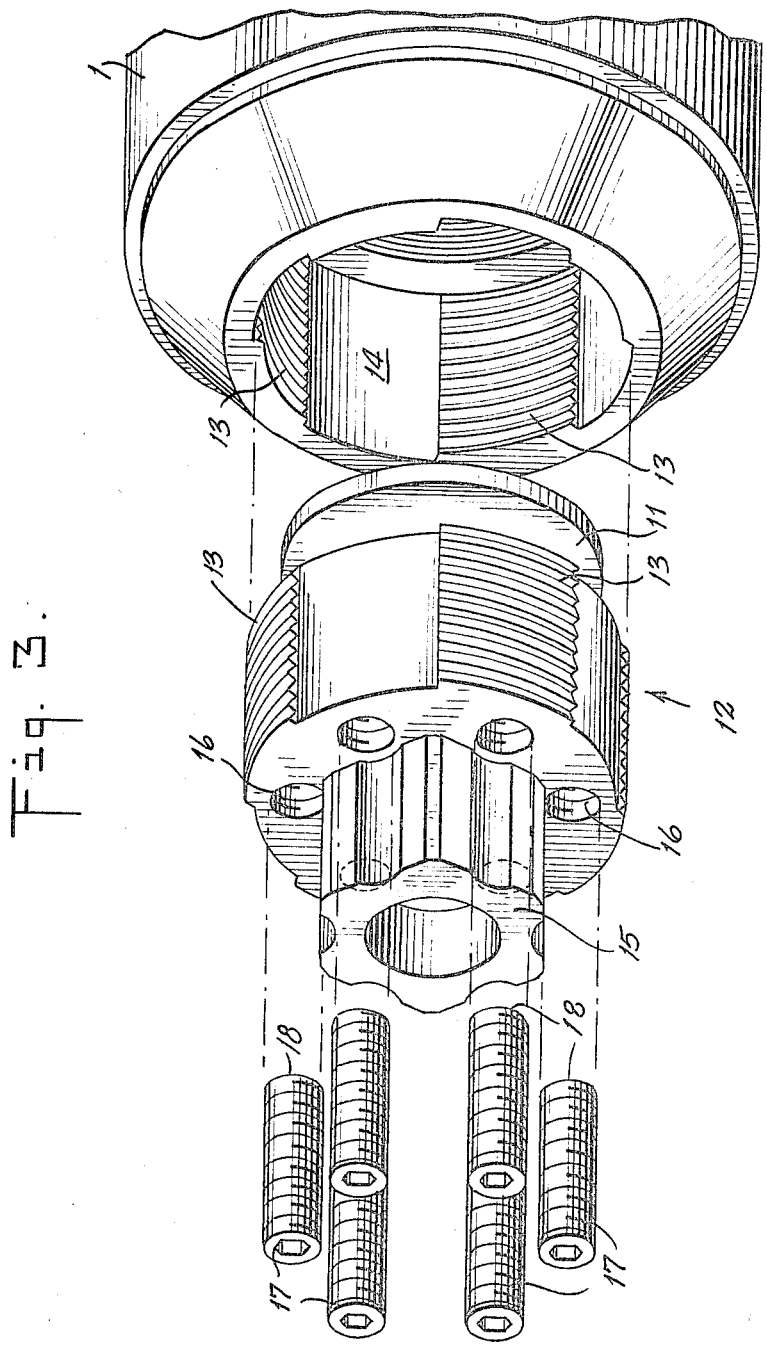
FIG. 3 is an exploded view of a nozzle retainer assembly.

The retainer assembly is received by an injection molding machine cylinder 1 which may be of generally conventional design, including means for receiving the rubber or other plastic material to be extruded in a bore 2 and for subjecting it to injection pressure. The forward portion of the cylinder 1 comprises a heating chamber, the temperature being controlled by heat transfer means 3 and the plastic flow of the rubber or other stock being directed into contact with the heated walls by a torpedo 4. The material is extruded through a shaped nozzle member 5 which opens at 6 into a mold cavity through a sprue. The forward portion of the cylinder is illustrated with a fixed platen 7.

In the specific illustrated embodiment of the applicant's invention, the nozzle 5 is preloaded or compressed at portion 8 against a nozzle seat 9 which is a shoulder within the injection cylinder 1. The nozzle 5 has a shoulder portion 10 for receiving the preload compression. A hard ring member 11 is provided adjacent the shoulder 10.

The nozzle retaining assembly 12 is provided with breech lock threads 13 as is a counterbore 14 in the head of the injection cylinder 1. Accordingly, the assembly may be quickly positioned and locked in position against the hard ring 11 and the nozzle shoulder 10. Or, in other words, the assembly is received on the injection cylinder outwardly of the nozzle shoulder 10 to provide a barrier that can receive thrust applied between it and the shoulder and transmit it to the cylinder.

The retainer assembly body portion 15 is provided with a series of passageways 16 each of which receives a jack set screw 17. These jack screws 17 bear at their leading edge 18 against the hard ring 11.

In operation, and after the retainer assembly body 15 has been preset in position against hard ring and nozzle, the jack screws 16 are tightened alternately to preselected torque levels. This applies thrust between the nozzle and the barrier provided by body 15, which has been heretofor received to the cylinder.

Since each screw may be designed to receive the maximum torque that can be conveniently applied manually, they may together exert much greater thrust against the nozzle (optionally through a hard ring) than could be obtained by the use of an annular nozzle retaining ring alone.

Since the jack screws have a relatively small diameter and frictional radius as compared to the old annular nuts that threaded directly into the injection nozzle, they can be broken loose relatively easily when the nozzle must be removed. Also, since they have a relatively small thread area in contact with the assembly body 15 (and higher thread loading per unit of area) as compared with the thread area of an old annular nut in contact with the injection nozzle, there is less chance for contamination and seizing of the threads.

Since the breech lock threads can be operated as soon as the load is released, the assembly and the nozzle can be removed and reinserted much more rapidly than was possible with the old annular nut.

By means of the preset nozzle retainer assembly of the present invention it is possible to achieve such great precompression forces that a press may be designed with a torpedo 4 that bears against and is axially retained solely by the inner face of the nozzle 5.

I claim:

1. In an injection molding machine having an injection cylinder partially closed at one end by a removable injection nozzle, and means for retaining said nozzle comprising a threaded cylindrical chamber at the end of the injection cylinder positioned about the injection nozzle, a nozzle retaining assembly threaded into said chamber and about the nozzle behind a shoulder thereon, said retaining assembly having high pressure means for applying thrust against said nozzle shoulder.

2. The injection molding machine of claim 1 in which said high pressure means is a plurality of jack screws.

3. In an injection molding machine having an injection cylinder closed at one end by an injection nozzle having a shoulder on the side opposed to the nozzle seat, means for quickly removably retaining and precompressing the nozzle in position on its seat at the end of the cylinder against the working injection pressure which comprise a cylindrical chamber at the end of the injection cylinder positioned to lie about the nozzle when it is in place, said chamber being provided with breech lock threads, a nozzle retaining assembly with matching threads for insertion into said chamber, said assembly having a plurality of jack screws, each screw adapted to independently thrust against the nozzle shoulder to precompress the nozzle into position against its seat, so that the nozzle may be conveniently removably held in position by placing it against its seat, slipping the retaining assembly into its chamber and then locking it snugly against the nozzle by a fractional turn, and then compressing the nozzle against its seat with sufficient force to withstand the working injection pressures by alternately tightening the individual jack screws.

4. The nozzle retaining means of claim 3 in which a hard ring is interposed between the nozzle shoulder and the jack screw to absorb and distribute their thrust and wear.

5. An injection molding machine including an injection cylinder, said cylinder having a nozzle seat, said cylinder having a cylindrical threaded chamber extending about and outwardly from said seat, a nozzle adapted to be held in position against said seat and having a bearing shoulder disposed opposite the surface designed to seal against said seat, an injection nozzle retaining assembly threaded into said chamber, said assembly carrying a plurality of jack screws, each of said jack screws being adapted to bear individually against said nozzle shoulder to press it into position against the nozzle seat.

6. An injection molding machine having an injection cylinder with a seat at one end to receive a nozzle and a chamber extending outwardly from said seat to receive retaining means, a nozzle adapted to be placed on said seat and bearing a shoulder positioned to lie opposite to said seat, and means for securing a jack screw assembly behind said nozzle shoulder whereby the nozzle may be precompressed against the working pressures of the extrusion press by torquing the individual jack screws.

7. In an injection molding machine including an injection cylinder, a seat formed on the forward head end of said injection cylinder to receive a nozzle and a nozzle located against said seat and having an outwardly facing shoulder portion opposite to the seat engaging portion; a barrier means secured to the end of the injection cylinder outwardly spaced from the said shoulder on said nozzle and high pressure compression means for applying thrust between said shoulder and said barrier means to precompress the portion of the nozzle lying adjacent to said seat into and against said seat.

8. In an injection molding machine having an injection cylinder partially closed at the head end by a removable injection nozzle, said nozzle being received on a cylinder seat and having a shoulder portion opposite to the seat engaging portion; means for retaining said nozzle comprising a barrier means, said barrier means having a quick lock threaded connection to the injection cylinder and said barrier means being located over said nozzle shoulder, and high-pressure means carried by said barrier means for applying high-pressure thrust between said barrier and said shoulder in an area axially spaced from said seat.

9. In an injection molding machine including an injection cylinder with a seat formed in the forward portion thereof and with a nozzle adapted to be placed and sealed against said seat, the nozzle having a shoulder thereon facing away from said seat engaging portion; a nozzle retaining assembly comprising a locking means adapted to be secured to the forward end of the injection cylinder outwardly of the seat engaging portion of said nozzle and compression means for placing material in compression between said locking means and the shoulder portion on said nozzle so that the nozzle is compressed against the seat.

References Cited by the Examiner
UNITED STATES PATENTS

| | | | |
|---|---|---|---|
| 1,684,203 | 9/1928 | Royle | 18—12 |
| 2,037,823 | 4/1936 | Royle | 18—12 |
| 2,770,836 | 11/1956 | Hankey | 18—12 |
| 2,895,167 | 7/1959 | Paggi | 18—30 |
| 2,962,759 | 12/1960 | Maccaferri | 18—30 |
| 3,108,326 | 10/1963 | Thiel | 18—30 |

FOREIGN PATENTS 606,879   8/1948   Great Britain.

J. SPENCER OVERHOLSER, *Primary Examiner.*

MICHAEL V. BRINDISI, *Examiner.*

W. L. McBAY, *Assistant Examiner.*